Patented Mar. 13, 1934

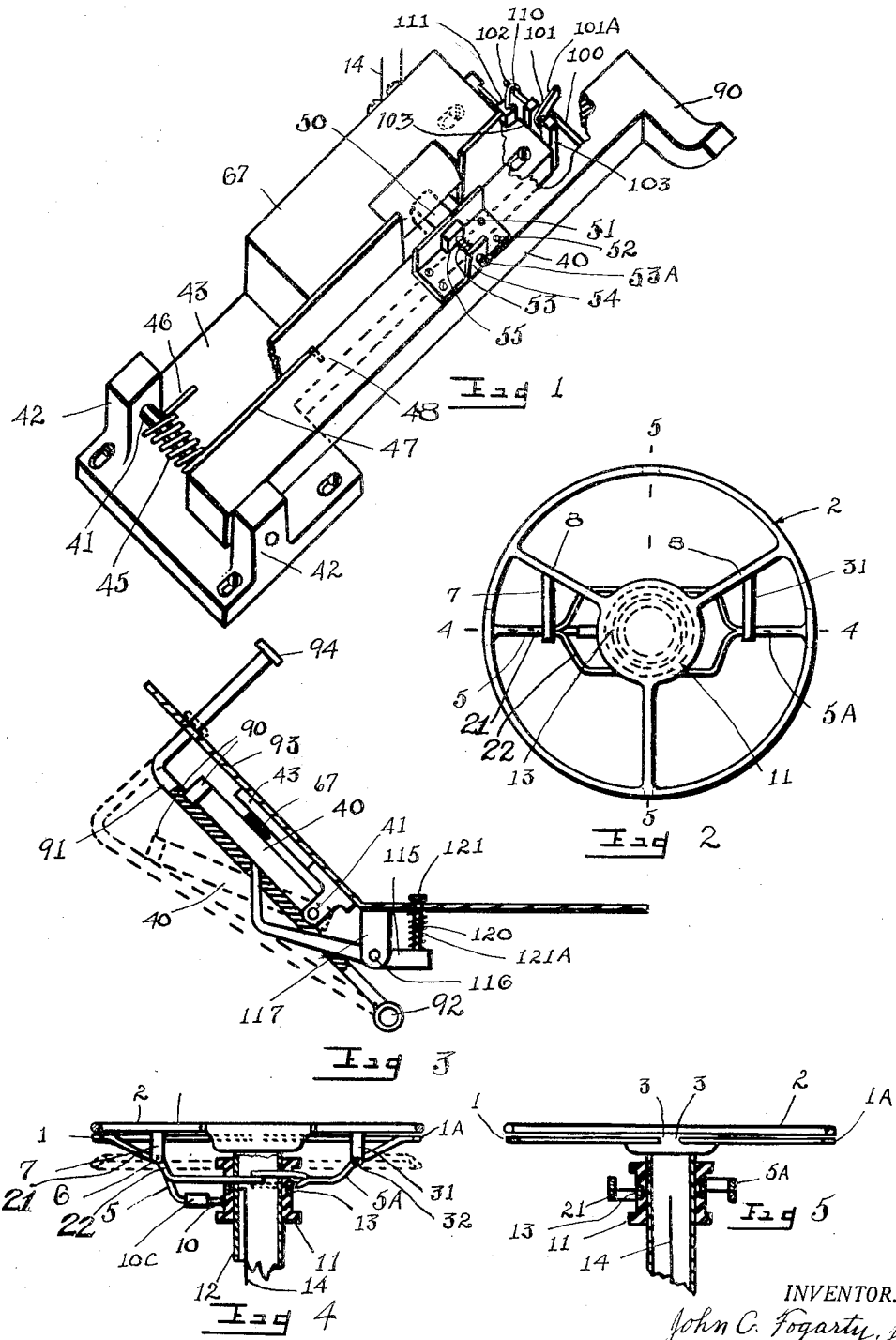

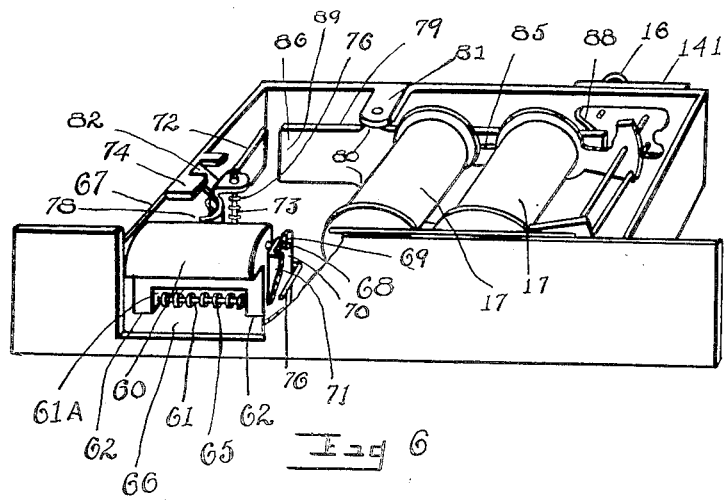

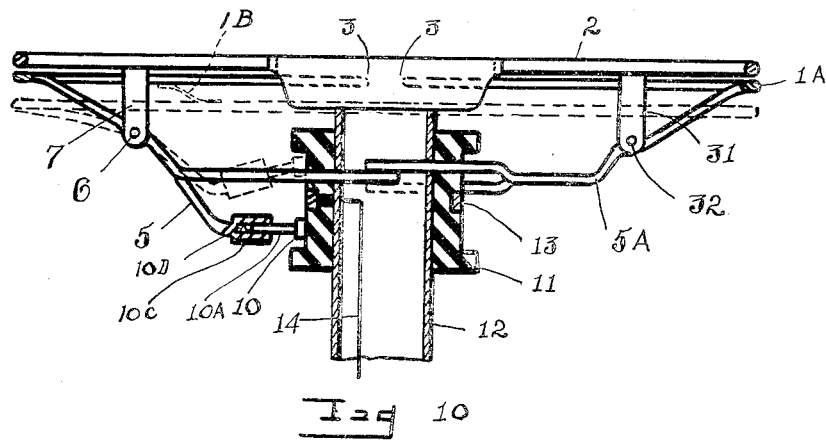
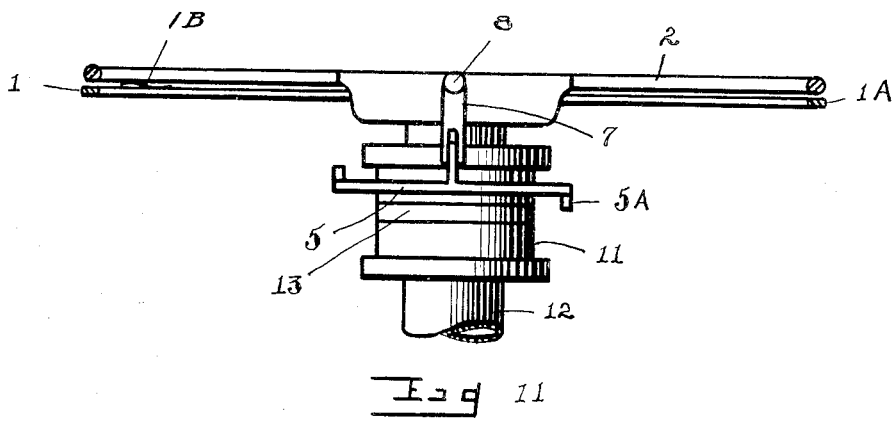
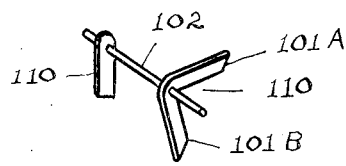

1,951,189

UNITED STATES PATENT OFFICE 1,951,189

AUTOMATIC BRAKE AND ELECTRIC IGNITION CONTROL FOR AUTOMOBILES

John C. Fogarty, Jr., Clinton, N. Y.

Application March 15, 1933, Serial No. 660,972

7 Claims. (Cl. 192—1)

My invention relates to an automatic brake and electric ignition control for automobiles and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a device that will automatically set the brakes and turn off the ignition in the event the operator or driver of the automobile should become temporarily incapacitated or otherwise unable to operate the automobile.

The object will be understood by referring to the drawings in which,

Fig. 1 is a perspective view of certain parts of the mechanism.

Fig. 2 is a plane view of the steering wheel that is used in connection with the other parts.

Fig. 3 is a vertical sectional view of the floorboard and contiguous parts of an automobile showing certain parts of the automatic mechanism attached thereto.

Fig. 4 is a sectional view taken on the line 4—4 of Fig. 2 parts being broken away.

Fig. 5 is an elevational view of the steering wheel and certain parts connected thereto, other parts being shown in section and some broken away, taken on the line 5—5 of Fig. 2.

Fig. 6 is a detailed view showing a perspective of certain electric solenoids and immediate parts that are used.

Fig. 7 is a diagrammatic view of the electric wiring.

Fig. 8 is a detailed enlarged view showing a perspective of a bracket that is employed.

Fig. 9 is a detailed view showing a perspective of certain forked members employed.

Fig. 10 is an enlarged view showing a section on the line 4—4 of Fig. 2, parts being in full.

Fig. 11 is an enlarged view showing a section on the line 5—5 of Fig. 2, parts being in full.

Fig. 12 is a detailed view showing a bell crank lever and immediate parts used.

Referring more particularly to the drawings, the device embodies segmental members 1, 1A which are disposed in parallel relation to the steering wheel 2 and along the underside thereof. Members 1, 1A are separated from each other at their ends 3, 3 although they cover nearly the whole of the underside of the steering wheel 2.

Segmental or arc shape members 1, 1A are held in given spaced relation to steering wheel 2 by means of levers 5, 5A. Lever 5 is of irregular shape and is fulcrumed at 6 to bearing bracket 7 that depends from spoke 8 of steering wheel 2. The free end 10 of lever 5 lies adjacent to bakelite sleeve 11 which is mounted to steering post 12 in a tight manner whereby to hold it in given position thereon. End 10 is mounted on a spring presser plunger 10A which has a sliding bearing in a recess made in the enlarged end 10C of lever 5. Coiled spring 10D housed in said recess normally pushes end 10 against bakelite sleeve 11.

Sleeve 11 has mounted therein an electric annular contact member 13, whereby its outer surface is exposed. Contact member 13 is connected by an electric wire 14. Said electric wire 14 is insulated and passes through insulated sleeve 11 and through steering post 12 to the hollow interior thereof. It will complete a ground circuit through contact member 13, end 10 of plunger 10A, lever 5, bracket 7, spoke 8, steering post 12, to the chassis of the automobile, not shown, when said end 10 passes the electric contact member 13 when actuated as hereinafter explained.

Lever 5 is pivotally mounted at 6 to depending bracket 7 to allow the free end 10 to move upward past electric contact member 13 of sleeve 11 and thereby close the electric circuit as it moves therepast. Free end 10 is held normally downward out of contact with electric contact member 13, manually by gripping steering wheel 2 and enclosing one or both of the arc shaped members 1, 1A in the hand or hands that grip wheel 2.

Either hand or both can therefore be utilized to hold the free end of plunger 10A out of electrical connection with member 13. To this end, lever 5 has a branch arm 21 that is fork shaped at 22. Fork 22 cooperates with the fork shaped ends of lever 5A, which is pivotally mounted to depending bracket 31 at 32 by having its ends alternating above and below the corresponding ends of the fork of lever 5A as shown in Fig. 9.

Contact end 10 of lever 5 will be moved into electrical connection with member 13 when both hands are released from wheel 2 thereby allowing the arc shaped members 1, 1A under the force of gravity or their own weight to move downward as shown in dotted lines in Fig. 4 and end 10 of lever 5 to move up past member 13 thereby making a temporary electrical circuit as it moves therepast to its upper position to complete the circuit, hereinafter explained. The weight of member 1A is sufficient to overcome the weight of the lower end of levers 5 and 5A and of spring pressed element in lever 5, when allowed to fall downward. However, springs 1B, 1B, may be disposed at diametrically opposite positions between members 1, 1A if found desirable to make the action of member 1A positive.

It will be observed that as wheel 2 rotates to steer the automobile, contact 10 will rotate about sleeve 11 without making an electric contact.

The mechanism for setting the brakes and turning off the ignition switch embodies a rock lever 40 pivotally mounted on shaft 41 which is supported in bearing blocks 42, 42 formed integral with base 43.

The means for rocking lever 40 normally forward embodies coil spring 45 mounted on shaft 41 and having one end extended and resting on base 43 at 46 and the other end extended at 47 and secured at 48 to rock lever 40. It will be observed therefore, that coil spring 45 normally urges rock lever 40 toward a predetermined position.

The means for holding rock lever 40 against the tension of spring 45 embodies a latch member 50 that has a sliding fit with bracket 51 attached by screws 52 to rock lever 40. Latch 50 has formed integral therewith a stud 53 that has a free bearing in upright member 54 of bracket 51. The end of stud 53 is enlarged at 53A to limit its movement relative to member 54. A coil spring 55 bears at one end against the contiguous surface of latch 50 and its opposite end against the near side of member 54, whereby to urge latch 50 normally forward away from lever 40. The free end of latch 50 engages a spring pressed rock member 60 that is pivotally mounted upon a shaft 61. Said member 60 is recessed at 61A to provide two bearing parts 62, 62. It is held in predetermined position by coil spring 65 mounted upon shaft 63 and fastened at one end to a bearing part 62 and at the other, extended along base part 66 of auxiliary casing 67. The upper end of rock member 60 has formed integral therewith a laterally extending stud 68 that rests in a recess 69 made in bracket 70 which is fastened at 71 to auxiliary casing 67. Stud 68 slides along said bracket within the recess 69 and it is limited thereby.

The means for controlling the movements of member 60 embodies a spring pressed connecting link 72 that is pivotally mounted upon shaft 73 having a bearing in its upper end in overhanging portion 74 of auxiliary casing 67. The lower end of said shaft 73 rests in a bearing in base 66 of auxiliary casing 67.

Connecting link member 72 is held in predetermined position by coil spring 76 which is mounted on shaft 73 and has one end passing through and bearing against the forward surface of link member 72. Its opposite end is fastened to bracket 70 mentioned above. Link member 72 will be held with its end 78 therefore in contact with rock member 60 by said spring 76. The opposite end of connecting link member 72 lies opposite the one end of lever 79.

Lever 79 has trunnions 80, 80 thereon to support it in a pivotal manner to the over-hanging portion 81 of auxiliary casing 67 and base 66 of said auxiliary casing. One end of lever 79 is disposed opposite solenoids or magnets 17, 17. A flat spring 85 is attached to lever 79 and has its free end resting against solenoids 17, 17, whereby to hold lever 79 with its end 86 in the path of connecting link member 72.

A stop member 82 formed by cutting and pressing inward a portion of overhanging part 74 of auxiliary casing 67 limits the rock movement of link member 72. Likewise, a stop member 88 formed in auxiliary casing 67 by cutting and bending inward a part thereof limits rock movement of lever 79.

When solenoids 17, 17 are energized they will draw the end of lever 79 there-opposite toward said solenoids, thereby rocking said lever 79 and moving its end 86 out of the path of connecting link member 72, whereby rock member 60 will be free to move backwards out of connection with latch member 50.

This backward movement of rock member 60 against the tension of its spring 65, permits latch member 50 to move there-past when rock member 40 moves forward under tension of its spring 45.

The free end of rock member 40 is provided with a laterally projecting member 90 which extends across the surface of foot brake lever member 91. Foot brake lever member 91 is fulcrumed upon a shaft 92 having bearings in the chassis of the automobile frame. The opposite end of lever 92 is bent at right angles and projects through an enlarged aperture of footboard 93. Its outer end has a footplate 94 whereby lever 91 can be actuated from full line position shown in Fig. 3 to dotted line position upon its fulcrum 92 either by pressing with the foot upon plate 94 or by the actuation of lever 40 under tension of its spring 45.

A laterally extending shaft 100 projects from the upper end of lever 40 and lies in the path of a bell-crank lever 101 which is mounted to turn with shaft 102 having bearings in upstanding bracket members 103, 103, that are bolted or otherwise secured to the edge of base plate 43 of auxiliary casing 68. Shaft 102 has attached to turn therewith a switch 110 which controls the ignition circuit of the automobile, not shown.

The ignition switch 110 engages socket member 111 as shown in Fig. 1 to close the electric ignition circuit and moves out from said socket 111 to break said circuit.

The means for resetting lever 40 to operative position, embodies a rock member 115 pivotally mounted upon shaft 116 carried in depending bearing brackets 117 that are fastened to the floorboard 93. The free end of rock member 115 rests against the underside of lever 40. The opposite end of rock member 115 has an upstanding stud 120 with a foot pedal 121 thereon that projects through floorboard 93. A coil spring 121A is mounted on upstanding member 120 and normally presses lever 115 against the underside of lever 40 into full line position shown in Fig. 3 or so that the opposite end of said lever 40 will prevent the end of said lever 115 from rattling against the underside of lever 40.

The electric wiring for forming the electric circuits is illustrated diagrammatically in Fig. 7. Starting with steering post 12, wire 14 runs to terminal post 16, besides making an electrical connection at 130 to steering post 12, whereby to ground the same; wire 15 from post 16 is solenoid 17; solenoids 17, 17 are connected by making their coils continuous; the other solenoid 17 has a wire 131 which runs to terminal post 133; wire 134 runs from terminal post 133 to knife switch 110 and wire 135, from knife switch 110 to the main switch 136 of the automobile which latter switch is ordinarily used for turning on the ignition. Wire 137 runs from switch 136 to the spark plugs, not shown, by which they are grounded; socket 111 of the knife switch heretofore spoken of, is connected by wire 138 to battery 139 and is grounded by wire 140, to the chassis of the automobile, not shown. Posts 16 and 133 are mounted on a bakelite member 141 that is mounted to casing 67.

The operation of the device is effected when the operator of the automobile releases his hands from steering wheel 2 or allows his grip of members 1, 1A to loosen whereupon said members 1, 1A under the force of gravity fall downward and cause the electrical contact end 10 of lever 5 to make a temporary electrical contact as it passes therepast to its upper position shown in dotted lines in Fig. 10, with member 13 which will complete an electrical circuit through the solenoids 17, 17 to energize the same. This will draw lever 79 theretowards, whereby its free end 89 will be out of the path of connecting link member 72.

This latter movement of lever 79 whereby its free end is out of the path of connecting link member 72 will permit the end of member 72 to rock free of member 60 which will rock under pressure from latch member 50 that is impelled forward with lever 40 under the influence of the much greater strain of coil spring 45.

As lever 40 rocks forward, its free end 90 will force brake lever 91 from full line position shown in Fig. 3 to dotted line position shown therein and thereby rock shaft 92 to set the brakes.

Simultaneously with the rocking forward of lever 40, shaft 100 carried thereby will make contact with upper arm 101A of bellcrank lever 101 and rock said bellcrank lever 101 which, in turn, rocks shaft 102 and switch 110 mounted thereon free from socket 111 to open the ignition circuit.

In order to reset the parts in their original position, the operator can grasp one or both of arc shaped members 1, 1A and draw them towards steering wheel 2. This will cause end 10 of lever 5 to pass below electrical contact member 13, whereby to avoid an electric contact as lever 40 is moving into reset position.

Lever 40 will now be returned to normal position by pushing downward on pedal 121 of stud 120 whereupon latch 50 will ride past rock member 60 and re-engage therebeneath.

This same return motion of lever 40 will cause shaft 100 to strike lower arm 101B of bellcrank lever 101 and rock shaft 102 to return electric switch 110 into socket 111 to close the ignition circuit.

Having thus described my invention what I claim as new and desire to secure by Letters Patent is as follows:

1. In an automatic brake setter, an ignition switch, a steering wheel, members disposed contiguous with said steering wheel, levers connected with said last named members and one of said levers having an electric contact point whereby to cross an electric circuit, a lever controlled by said electric circuit and spring means for actuating said last named lever, whereby to set the brakes and break the ignition circuit.

2. In an automatic brake and electric ignition control, a steering wheel, members mounted near said steering wheel, levers connected to said members, and one of said levers adapted to make an electric connection at predetermined intervals.

3. In an automatic brake and electric ignition control, a steering wheel mounted on a steering post, a sleeve having an annular electric contact member thereon, arc shaped members mounted near said steering wheel, and means whereby said arc shaped members can cause an electric circuit at predetermined intervals.

4. In an automatic brake and electric ignition control, a steering post having a sleeve member mounted thereon, an annular electric contact member mounted on said sleeve, another member adapted to make an electric contact with said annular contact member and means for manually holding said last named member out of contact with said annular electric contact member.

5. In an automatic brake and electric ignition control, a steering post having a sleeve mounted thereon, an annular electric contact member mounted upon said sleeve, an electric contact point adapted to make contact with said annular electric contact member at predetermined intervals, manual means for holding said electric contact point out of connection with said annular electric contact member and means whereby the rotation of said electric contact point independently of said steering post will not disturb their relative relations to each other.

6. In an automatic brake and electric ignition circuit control for an automobile having brakes and an electric ignition circuit, a lever having a spring pressed latch attached thereto, a spring actuated rock member for holding said latch in predetermined position, means for releasing said rock member, whereby said lever will set the brakes of an automobile, a member projecting from said lever and a second lever adapted to be actuated by said first named lever, whereby to control the electric ignition circuit.

7. In an automatic brake and electric ignition control for an automobile having brakes and an electric spark circuit, a spring pressed lever, a spring pressed latch member mounted on said lever, a spring actuated rock member for holding said latch in predetermined position, electric means for releasing said rock member, whereby to allow said first named lever to set the brakes of an automobile, and means projecting from said first named lever, whereby to control the electric spark circuit of said automobile.

JOHN C. FOGARTY, JR.